United States Patent

Burnett

[11] Patent Number: 6,116,037
[45] Date of Patent: Sep. 12, 2000

[54] DIRECT CURRENT POWERED MOBILE AIR CONDITIONER

[75] Inventor: Keith G. Burnett, Charlotte, N.C.

[73] Assignee: Recreational Products, Inc., Van Wyck, S.C.

[21] Appl. No.: 09/235,074

[22] Filed: Jan. 21, 1999

Related U.S. Application Data

[60] Provisional application No. 60/072,349, Jan. 23, 1998.

[51] Int. Cl.[7] .................................................. B60H 1/32
[52] U.S. Cl. .................................. 62/239; 62/243; 62/454
[58] Field of Search ............................... 62/239, 243, 244, 62/454, 455

[56] References Cited

U.S. PATENT DOCUMENTS

| | | | |
|---|---|---|---|
| 3,094,850 | 6/1963 | Newton | 62/132 |
| 3,475,919 | 11/1969 | Ellis | 62/228 |
| 3,603,105 | 9/1971 | Figa | 62/243 X |
| 3,885,398 | 5/1975 | Dawkins | 62/243 X |
| 3,983,715 | 10/1976 | Hair et al. | 62/243 X |
| 3,984,224 | 10/1976 | Dawkins | 62/243 X |
| 4,051,691 | 10/1977 | Dawkins | 62/243 X |
| 4,217,764 | 8/1980 | Armbruster | 62/239 |
| 4,825,663 | 5/1989 | Nijjar et al. | 62/236 |
| 4,870,833 | 10/1989 | Matsuda et al. | 62/134 |
| 4,945,977 | 8/1990 | D'Agaro | 165/43 |
| 5,199,274 | 4/1993 | Yoshida et al. | 62/228 |
| 5,214,938 | 6/1993 | Kennedy et al. | 62/515 |
| 5,247,808 | 9/1993 | Yoshida et al. | 62/228 |
| 5,289,698 | 3/1994 | Garimella | 62/239 X |
| 5,307,645 | 5/1994 | Pannell | 62/243 X |
| 5,675,986 | 10/1997 | Chen | 62/426 |

Primary Examiner—William Doerrler
Assistant Examiner—Chen-Wen Jiang
Attorney, Agent, or Firm—Dougherty & Associates

[57] ABSTRACT

A very efficient direct current mobile air conditioning unit suitable for use with vehicles and capable of extended periods of operation while powered by a 12 volt battery is described. The direct current mobile air conditioning unit comprises at least one oil-less compressor and condenser coils and evaporator coils wrapped in metal gauze, where air is moved across the evaporator coil and condenser unit by highly efficient axial fans.

8 Claims, 2 Drawing Sheets

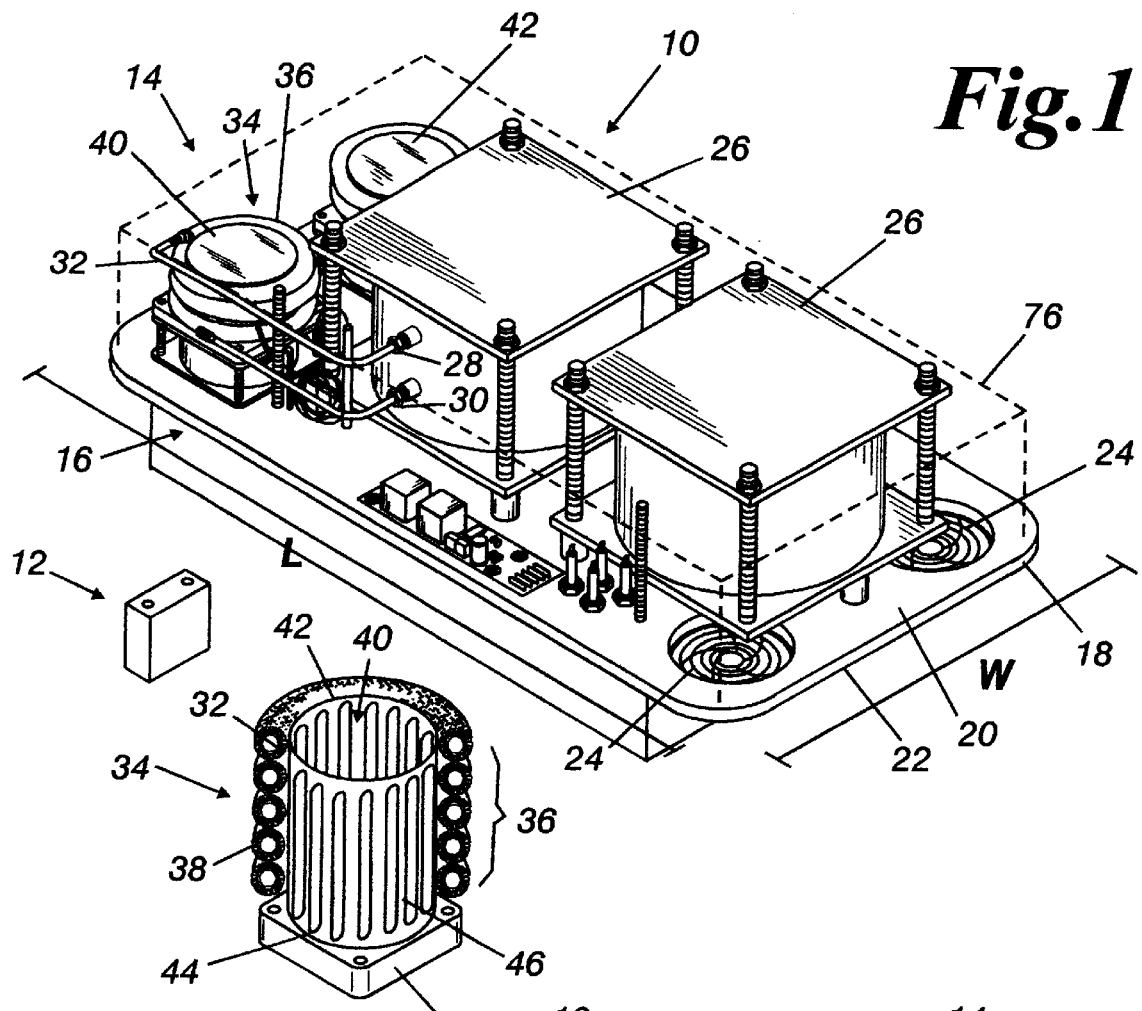
Fig.1
Fig.2
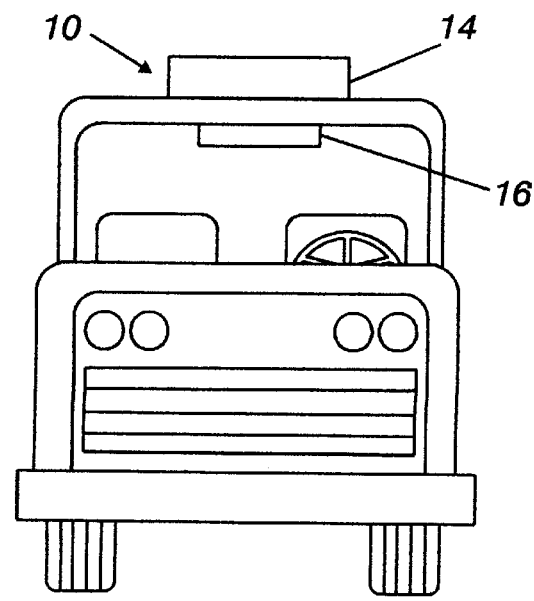
Fig.3

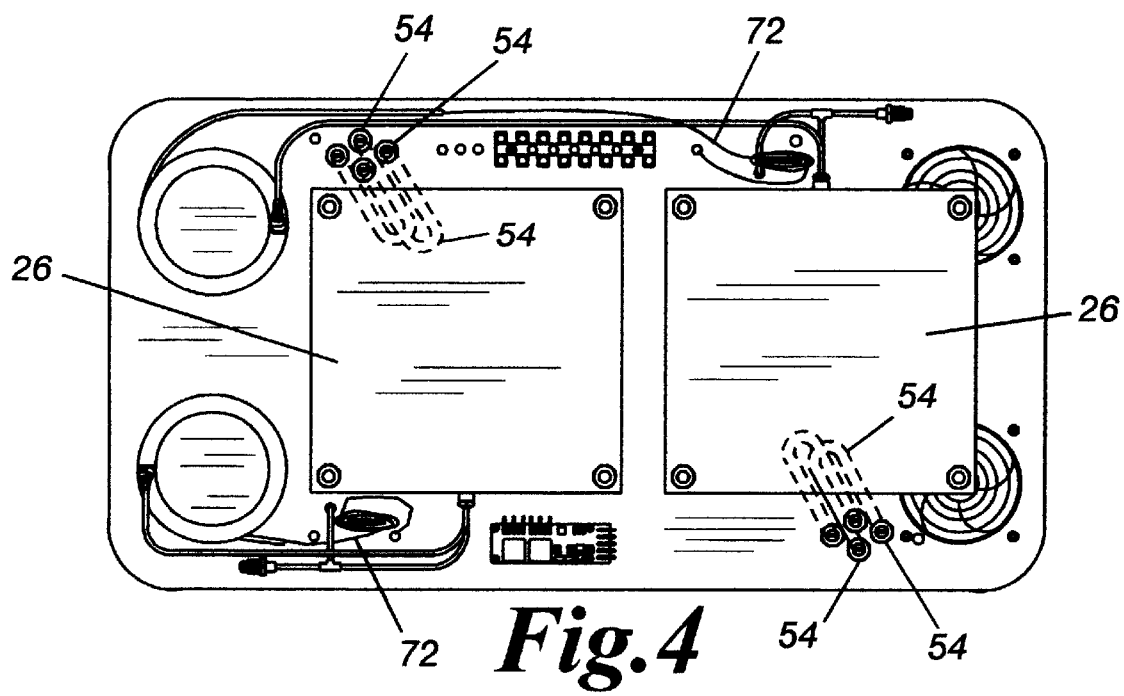
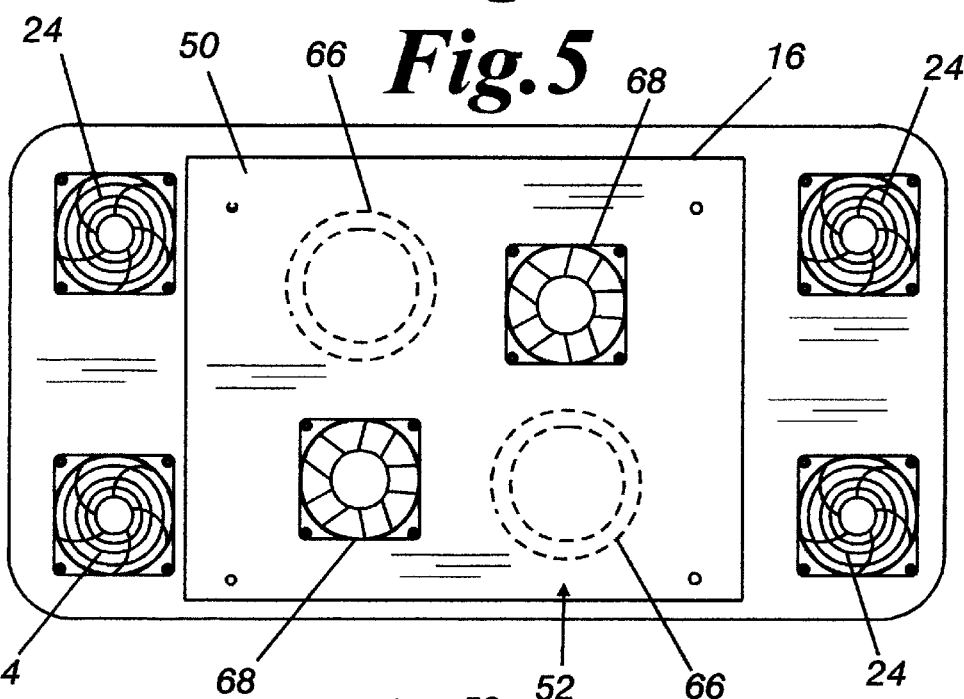
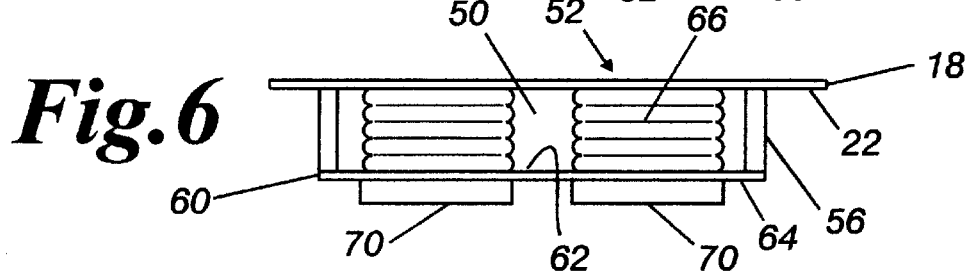

DIRECT CURRENT POWERED MOBILE AIR CONDITIONER

CROSS REFERENCE TO RELATED APPLICATION

This application claims the benefit of U.S. Provisional Application Ser. No. 60/072,349 filed Jan. 23, 1998.

FIELD OF THE INVENTION

The present invention relates generally to mobile air conditioning devices. More particularly, the present invention relates to a mobile air conditioner that can operate for sufficiently long periods of time powered only by a direct current power source.

BACKGROUND

Air conditioning units are particularly useful for regulating the climate in an enclosed space. Currently, air conditioning units are used for cooling the interior spaces of vehicles, such as recreational vehicles, mobile homes, boats, and tractor trailer cabs. The most common type of existing air conditioning unit has the compressor connected directly to the vehicle's engine. These units operate only while the vehicle's engine is running.

As a result of this requirement that the air conditioning unit only operate while the vehicle's engine is running, some existing mobile air conditioning units provide means for connecting it to an alternating current (AC) supply outlet. The limited availability of AC supply outlets; however, limits the utility of this alternative. While vehicles, such as recreational vehicles, mobile homes and boats are primarily used by their owners to escape from the confines of modern society, AC supply outlets are only available in certain fixed locations, such as a primary camp site. In most instances, however, hooking-up to an AC supply outlet is impractical or undesirable. The problem is that the vehicle must be taken to the AC supply outlet. As a result, vehicle owners lose the freedom to take their vehicles to the places they desire. Consequently, owners of those vehicles are unable to maximize their enjoyment of the vehicle because of the limitations in the availability of AC supply outlets.

Other existing mobile air conditioning units are powered by auxiliary power supplies located in the vehicle. Some systems even provide auxiliary air conditioning units that can be used when the main air conditioning units cannot be operated. Those systems that contain auxiliary components, however, are very bulky and are very expensive to install and operate.

The limitations of existing air conditioning units are exemplified in the problems faced by tractor trailer drivers. Often times, drivers will sleep in the cab while they are on the road. When drivers become tired, they pull off to the side of the road or into a designated rest area. Unfortunately, AC supply outlets are rarely, if ever available, at those locations to power an air conditioning unit. As a result, the driver must make a decision whether to forego cooling/heating or to leave the vehicle's engine running so that the air conditioning unit does not drain the battery. If the air conditioning unit is not operating, the climate in the cab may become unbearable. If the vehicle's engine is left running for a long period of time, serious damage could result to the engine and, at a minimum, the engine's life span will be greatly reduced. Furthermore, the driver risks death from carbon monoxide poisoning. Existing direct current air conditioning units, however, will quickly drain the vehicle's battery. After only a couple of hours of operation, the battery may be drained to such an extent that the battery will not have enough power to start the vehicle's engine.

Existing mobile air conditioning units are very inefficient. To compensate for this inefficiency, existing units utilize more power by connecting batteries in parallel. This, however, greatly increases the expense of the unit. Typically, air is blown with a squirrel cage blower over an aluminum fin tube heat exchanger. Aluminum evaporators also create a significant amount of condensate which creates a problem with condensate drip. Consequently, the warm air return/cool air delivery system on existing systems must be configured in such away that condensate does not drip down into the cooled area. As a result cool air delivery vents must be positioned to deliver cool air against the flow of the natural air currents of the cooled area.

A need, therefore, exists for a mobile air conditioning unit that can be operated on a DC power source for extended periods of time while the vehicle's engine is not running.

While there are numerous methods and means for air conditioning a vehicle, none are known to have a similar structure to, or to function in the manner of, the present invention.

OBJECTS OF THE INVENTION

Accordingly, one of the objects of the present invention is to provide an air conditioning unit that can operate on a DC power source.

A further, and more particular, object of the invention is to provide a DC powered air conditioning unit that can operate on a DC power supply long enough to provide both useful cooling and reasonable battery life.

Another object of the invention is to provide a DC powered air conditioning unit that can effectively operate without completely draining the vehicle's battery.

Another object of the invention is to provide a device for selectively cooling or heating a vehicle's passenger compartment when the vehicle is in a remote location where no AC supply outlets are available.

Another object of the invention is to provide an air conditioning unit that utilizes natural convection currents in a generally enclosed space.

SUMMARY OF THE INVENTION

The invention is a refrigeration type mobile air conditioning unit capable of extended operation while powered by a direct current power source. The mobile air conditioning unit comprises two sections. The first section comprises the compressor and condenser portions of the mobile air conditioning unit. This first section is designed to set outside of the area to be cooled or heated. For example this first section may rest upon the cab of a truck.

The second section is situated adjacent to the first section, typically oriented to be underneath the first section during operation. This second section houses the evaporator assembly which provides cool air to the area to be cooled. The second section may also house heating elements that may be used to provide heated air to the area of concern.

While the mobile air conditioning unit can theoretically have any number of compressors, evaporators and condensers, limited only by power consumption, for purposes of this summary it will be assumed that only one of each of the mentioned components are present. Additional components will be addressed in the detailed description.

The first section typically comprises a platform having at least two circular air vents which allow air to flow through the platform. A rectangular housing, approximately the same length and width of the platform having four walls and a top is attached to the platform. When the housing is attached to the platform, a substantially enclosed space is created that is similar to a rectangular box having at least two holes.

A compressor is situated within the housing. Preferably the compressor is a hermetically sealed canister type oil-less compressor which houses a DC motor within the canister. Alternately this may be an automotive style compressor driven by an external DC motor. The compressor receives gaseous heat transfer medium (i.e. refrigerant) via copper tubing from an evaporator through a suction port, compresses it and pumps it out a discharge port to a condenser via copper tubing.

One element of increased efficiency exhibited by the invention over known systems is the air moving system. All air conditioners must move air across the condenser heat exchanger and the evaporator heat exchanger. Current practice among mobile air conditioner manufacturers is to use squirrel cage blowers or bladed fans to move this air. An axial fan also known as a tube axial fan, axial blower or tube axial blower is significantly more efficient than current practice. For example, a 105 cubic foot per minute 12 volt squirrel cage blower draws approximately 5 amps of power while an axial fan uses 0.5 amps of 12 volt power to do the same job. Approximately 30% of the power consumption of current practice mobile air conditioners is devoted to moving air across the evaporator and condenser. Utilizing axial fan technology cuts this amount to under 10%. This improvement alone, coupled with recent improvements in battery design makes a DC powered mobile air conditioner practical.

Another element of increased efficiency exhibited by the invention over known systems is an oil-less compressor. A refrigeration compressor does three jobs under current practice. One is to compress the refrigerant, the second is to pump the refrigerant through the system, and the third is to pump the required lubricating oil for the compressor parts through the system. Currently available oil-less compressors are not designed for refrigerants, but by adapting the concept pioneered for oil-less air compressors to refrigeration compressors the energy required to pump the oil through the system can be eliminated. The result is an energy savings of about 15% overall power consumed.

A condenser assembly is also situated with the housing. The condenser assembly is the component that condenses the refrigerant by transferring heat from the refrigerant to air flowing through the condenser assembly. The condenser assembly comprises at least one condenser coil connected via copper tubing to the discharge port of the above described oil-less compressor. The condenser coil is wrapped in a copper gauze and wound helically along the length of a cylinder such that each successive winding of the wrapped condenser coil touches the previous winding. The cylinder is closed at one end and open at the other. The cylinder wall is perforated. Axially attached to the open end of the cylinder is an axial fan. The axial fan is attached to the platform and axially aligned with one of the platform air vents. Alternatively a copper coil, aluminum fin heat exchanger may be used.

The axial fan unit is oriented to blow air out of the housing. Thus the following air flow path is formed. Air drawn by the suction created by the axial fan unit enters the remaining platform air vent and flows into the housing. The air is drawn toward the condenser assembly. The perforated cylinder wall forces all air flowing through the housing to come into intimate contact with the copper wrapped condenser coil where heat is transferred from the refrigerant to the air thereby condensing the refrigerant prior to its being transferred under pressure to an evaporator.

The second section of the mobile air conditioning unit is the section that is located within the area to be cooled (or heated if the unit contains heating elements). The second section of the mobile air conditioning unit comprises a substantially enclosed plenum formed by the first section's platform bottom surface, four side members and a bottom member. The bottom member has air vents situated opposite and spaced apart from one another. The second section is similar to the first section in that it resembles a rectangular box with air vents.

Attached to and axially aligned with the second section air vents are axial fans. One axial fan is oriented to draw air into the substantially enclosed plenum. The second axial fan is oriented to draw air out of the substantially enclosed plenum. Alternatively one larger axial fan may used to accomplish the same task.

The substantially enclosed plenum also houses at least one evaporator coil that is situated between the inlet air and outlet air vents. The evaporator coil is wrapped in a copper gauze and wound helically about a central point such that each successive winding of said evaporator coil touches the previous winding. The evaporator coil is connected at one end to the condenser via copper tubing and a restriction device and at the other end to the suction end of compressor. Additionally, the substantially enclosed plenum may also contain heating elements. Alternatively the heat exchanger may be a copper tube aluminum fin unit.

In operation, an axial fan draws air through the substantially enclosed plenum where the air comes into contact with the copper wrapped evaporator coil. The evaporator coil transfers heat from the air to the refrigerant thereby evaporating the refrigerant and cooling the air. If heating elements are present, the heating elements may be activated instead of the refrigeration system. Air that passes through the substantially enclosed plenum is then heated prior to discharge into the area of concern.

BRIEF DESCRIPTION OF THE DRAWINGS

The foregoing and other objects will become more readily apparent by referring to the following detailed description and the appended drawings in which:

FIG. 1 is a perspective view of one embodiment of the direct current powered mobile air conditioner according to the invention.

FIG. 2 is a cut away view of an evaporator assembly.

FIG. 3 is a schematic representation of one embodiment of the invention in use.

FIG. 4 is a top view of one embodiment of the invention absent a housing.

FIG. 5 is a bottom view of one embodiment of the invention.

FIG. 6 is a side view of the second or bottom section of one embodiment of the invention with one side removed.

DETAILED DESCRIPTION

Referring now to FIGS. 1–3, the present invention is a mobile air conditioning unit 10 that can be operated in remote locations where AC supply outlets cannot be found. A preferred embodiment of mobile air conditioning unit 10 is designed to operate attached to the cab of a tractor-trailer truck or possibly recreational vehicle as shown in FIG. 3.

The invented mobile air conditioning unit 10 is a highly efficient air conditioning system powered by a DC power supply 12, such as the battery utilized in a tractor-trailer truck. In a preferred embodiment, the direct current power source is a twelve Volt DC battery. Mobile air conditioning unit 10 is a highly efficient unit that can be operated by a DC power supply 12 for extended periods of time without exhausting the power of the DC power supply 12.

Referring now to FIG. 1, mobile air conditioning unit 10 is comprised of two sections: a first section 14 and a second section 16. Typically, mobile air conditioner 10 is mounted such that first section 14 will be situated outside of the space to be cooled, such as on the outside of a truck cab as shown in FIG. 3. First section 14 comprises a platform 18 having a top surface 20 and a bottom surface 22. Platform 18 has a definite length L and width W that can be adjusted depending upon the desired size of mobile air conditioner unit 10. In a preferred embodiment shown in FIG. 2, platform 18 has a length of approximately 70 cm and a width of approximately 45 cm.

Continuing with the preferred embodiment shown in FIG. 2, platform 18 contains at least two and preferably four platform air vents 24 situated diagonally opposite from one another and proximate to the outer perimeter of platform 18. See also FIG. 5. Movably attached to platform 18 is a first section housing 76. First section housing 76 is of approximately the same length and width of the platform 18 and has four walls and a top and forms a substantially enclosed space when attached to the platform 18. Platform air vents 24 are preferably of equal diameter and of sufficient diameter to provide a flow of air through first section housing 76 that is sufficient to allow efficient operation of the condenser assembly which is described below. In the preferred embodiment shown in FIG. 2, the platform air vents 24 are approximately 11 cm in diameter. Platform 18 also contains various other holes that serve as conduits for copper tubing connecting the condensers, evaporators and compressors, all of which are described below.

Referring now to FIG. 1 and FIG. 4, first section 14 also comprises at least one and preferably two compressors 26 situated within first section housing 76. Preferably the compressors 26 are canister type oil-less compressors with an internal DC motor. As discussed in the summary section, oil-less compressors are far more efficient at pressurizing heat transfer mediums, such as R-134(a), than are oil compressors. The compressors 26 have suction ports 30 and discharge ports 28. The discharge ports 28 are connected via copper tubing 32 to two condenser assemblies 34.

Referring now to FIG. 2, each condenser assembly 34 is a multi-component assembly designed to maximize heat transfer between air and a heat transfer medium (i.e., refrigerant). Condenser assembly 34 is comprised of copper tubing 32 which is used to move refrigerant, preferably R-134(a), between and through a compressor 26, a condenser assembly 34 and an evaporator assembly 52. See FIG. 6. Continuing with FIG. 2, copper tubing 32 forms condenser coil 36 which is surrounded by a highly heat conductive metal gauze 38, preferably copper. Condenser coil 36 is helically wound about a cylindrical tube 40. Cylindrical tube 40 has an enclosed top 42, (See FIG. 1) an open bottom 44 and a perforated wall 46. Condenser assembly 34 also comprises an axial fan unit 48.

The components of condenser assembly 34 work in the following manner. Condenser coil 36 is tightly wrapped by and is in direct contact with a heat conducting metal gauze 38, preferably copper. The large surface to mass ratio of metal gauze 38 works to greatly increase the ability of condenser coil 36 to transfer heat. Condenser coil 36, wrapped in metal gauze 38, is then tightly wrapped around cylindrical tube 40 in a helical fashion with each successive winding being in contact with the previous and successive winding. The number of windings may vary with the diameter and height of cylindrical tube 40. However, the wrapping of condenser coil 36 should cover the entire height of cylindrical tube perforated wall 46.

Axial (or tube axial) fan unit 48 draws air into and through first section housing 76. Axial fan unit 48 is attached to first section platform top surface 20 and is situated axially and above a platform air vent 24. Cylindrical tube 40 is axially aligned with and attached to axial fan unit 48 at cylindrical tube open bottom 44. Preferably, the diameter of cylindrical tube 40 is equal to or larger than the diameter of axial fan unit 48 while the diameter of first section air vent 24 is equal to or slightly smaller than the diameter of axial fan unit 48. After the components are in place it can be seen that condenser assemblies 34 are constructed such that axial fan unit 48 draws air into housing 76 and toward the condenser assemblies 34. Cylindrical tube perforated wall 46 forces all air flowing through the housing 76 to come into intimate contact with the condenser coil 36 and metal gauze 38. As the air passes through the condenser coil 36 and metal gauze 38, heat is transferred from the refrigerant to the air prior to the latter's passage through the cylindrical tube perforated wall 46, axial fan unit 48 and out housing 76 via platform air vent 24.

Any attaching means may be used to secure the attachment of the condenser assembly components. However, it is preferred that an epoxy resin be employed as the means to secure cylindrical tube 40 to axial fan unit 48 because the epoxy resin can serve the additional function of sealing the connections between these two components thereby ensuring that all air drawn by axial fan unit 48 comes through cylindrical tube perforated wall 46 thereby maximizing the heat transfer ability of condenser coil 36 and metal gauze 38.

Referring now to FIG. 5 and FIG. 6, the second section 16 houses the evaporator portion of the invented mobile air conditioning unit 10. Second section 16 comprises a substantially enclosed plenum 50 which houses an evaporator assembly 52. The substantially enclosed plenum 50 is formed by the first section platform bottom surface 22; side members 56 having a definite height, width and length and which are attached to the first section bottom surface 22 to form an enclosed polygon; and a bottom member 60 having a bottom member top surface 62 and a bottom member bottom surface 64 which is attached to the side members 56 opposite the first section platform bottom surface 22.

Substantially enclosed plenum 50 houses at least one evaporator assembly 52. In a preferred embodiment shown in FIG. 5 and FIG. 6, substantially enclosed plenum 50 houses two evaporator assemblies 52 situated proximate to one another along a diagonal of substantially enclosed plenum 50. Evaporator assemblies 52 are similar to the condenser assemblies 34 in that the evaporator assembly 52 is comprised of an evaporator coil 66. In a preferred embodiment the evaporator coil 66 is formed of copper tubing 32 and is connected to the condenser assembly 34 via capillary tubing 72. See FIG. 4. Capillary tubing 72 provides a barrier against which liquefaction occurs in the condenser assembly and controls the flow of liquid refrigerant. In an alternative embodiment, a restrictive device, such as a throttle valve, serves the same function as capillary tubing 72.

The evaporator coil 66 is tightly wrapped by and is in direct contact with a heat conducting metal gauze 38, preferably copper. The large surface to mass ratio of metal gauze 38 works to increase the ability of evaporator coil 66 to transfer heat from the surrounding air to the refrigerant. The evaporator coil 66, wrapped in metal gauze 38, is then tightly wrapped about a central point in a helical fashion with each successive winding being in contact with the previous and successive winding. In practice, evaporator assembly 52 is physically almost identical to condenser assembly 34 without cylindrical tube 40 and axial fan 48. The number and diameter of windings may vary with the size of substantially enclosed plenum 50.

Referring again to FIG. 5, arranged along the other diagonal of the substantially enclosed plenum 50 are at least two air vents 68. The air vents 68 should be of sufficient size to allow appreciable air flow through the substantially enclosed plenum 50. The air vents 68 may be located in either the side members 56 or the bottom member 60. In a preferred embodiment shown in FIG. 5, the air vents 68 are located in the bottom member 60, are circular and have the same diameter as the platform air vents 24. Axially aligned with the air vents 68 and attached to the bottom member bottom surface 64 are axial fan units 70. Axial fan units 70 are arranged such that one axial fan unit blows air into the substantially enclosed plenum 50 while the other draws air out of substantially enclosed plenum 50. Alternatively one larger fan many be used. In this manner air flows through the substantially enclosed plenum 50 and comes into intimate contact with the evaporator assemblies 52 where the air is cooled prior to exiting the substantially enclosed plenum 50.

In addition to evaporator assemblies 52, substantially enclosed plenum 50 may also contain electrical heating elements 54 such as TruHeat® resistance heat elements. See FIG. 4. Heating elements 54 may be situated anywhere within substantially enclosed plenum 50 but are preferably placed in close proximity to air vents 68. In a preferred embodiment shown in FIG. 4, heating elements 54 extend from first section platform top surface 20, through first section platform 18 and into substantially enclosed plenum 50 where heating elements 54 are situated above air vents 68. If this configuration is utilized care should be taken to make sure the heating elements are designed such that the portion of the element adjacent to the first section platform 18 does not get too hot and damage the first section platform 18. In this manner air may be heated as it is drawn across the heating elements 54 by axial fan units 70. The power supply to the mobile air conditioning unit 10 and its powered elements (i.e. compressor motor and axial fans) is controlled by d.c. circuits which in turn may be controlled by a single switch, multiple switches or a thermostat, all of which are well known in the art.

SUMMARY OF THE ACHIEVEMENT OF THE OBJECTS OF THE INVENTION

From the foregoing, it is readily apparent that I have invented an air conditioning unit that can operate on a DC power source long enough to provide both useful cooling and reasonable battery life. The invented unit can effectively operate without completely draining the vehicle's battery. Consequently, the unit can selectively cool or heat a vehicle's compartment when the vehicle is in a remote location where no AC supply outlets are available. The unit employs highly efficient components including a warm air/cool air delivery system that utilizes natural convection currents in a generally enclosed space.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A refrigeration type mobile air conditioning unit powered by a dc power source, said system having a first section and a second section;
    said first section comprising:
        at least one compressor; and
        a dc power system comprising a dc motor drivingly connected to said compressor and circuits for distributing direct current to other electrical components of the mobile air conditioning unit; and
        at least one condenser coil being fluidly connected to said compressor and wrapped in a metal gauze and wound helically to form a cylinder, further said condenser coil being attached to and axially aligned with an axial fan; and
    said second section comprising:
        a substantially enclosed plenum having at least two air vents; and
        at least one axial fan attached to said plenum and axially aligned with an air vent; and
        at least one evaporator coil situated within said substantially enclosed plenum; said evaporator coil being wrapped in a metal gauze and wound helically; further said evaporator coil being fluidly connected to said condenser coil and said compressor.

2. A refrigeration type mobile air conditioning unit of claim 1;
    said first section further comprising:
        a platform having at least two platform air vents upon which is attached said compressor; and
        a housing movably attached to said platform encompassing said compressor, said condenser coil and said platform air vents.

3. A refrigeration type mobile air conditioning unit of claim 1 where said metal gauze is copper.

4. A refrigeration type mobile air conditioning unit of claim 2 where said dc fan is attached to said platform and axially aligned with one of said platform air vents.

5. A refrigeration type mobile air conditioning unit of claim 1 wherein said second section further comprises at least one heating element housed within said plenum.

6. A refrigeration type mobile air conditioning unit capable of extended operation while powered by a direct current power source, said unit having a substantially enclosed first section and a substantially enclosed second section situated adjacent to one another
    said first section comprising:
        a platform having a platform bottom surface and a platform top surface, said platform having at least two platform air vents providing fluid communication between said platform top surface and said platform bottom surface, said platform air vents being spaced apart from one another; and
        a housing having four walls and a top movably attached to said platform top surface and encompassing said platform air vents;
        at least one oil-less compressor situated within said housing, said oil-less compressor having a suction port and a discharge port; and
        a direct current power system comprising a direct current motor drivingly connected to said oil-less compressor and circuits for distributing direct current to other electrical components of the mobile air conditioning unit; and at least one condenser assembly situated within said housing; said condenser assembly comprising at least one condenser coil fluidly connected to said discharge port of said oil-less compressor, said condenser coil being wrapped in a copper gauze and wound helically along the length of a cylinder such that each successive winding of said condenser coil touches the previous winding; said cylinder having a first and second end and a perforated wall; said first end being enclosed and said second end being attached to and axially aligned with a direct current fan, said direct current fan being attached to said platform and axially aligned with one of said platform air vents and oriented to draw air through said remaining platform air vents, through said condenser coil wrapped in a copper gauze and through said perforated cylinder wall and out into the atmosphere; and said second section comprising:

a substantially enclosed plenum formed by said platform bottom surface, four side members and a bottom member, said bottom member having at least two air vents situated opposite and spaced apart from one another, said air vents providing fluid communication through said substantially enclosed plenum; and first and second direct current fans attached to said bottom member and axially aligned with said air vents; said first direct current fan oriented to draw air into said substantially enclosed plenum and said second direct current fan oriented to draw air out of said substantially enclosed plenum; and at least one evaporator coil situated within said substantially enclosed plenum and between said first and second direct current fans; said evaporator coil being wrapped in a copper gauze and wound helically such that each successive winding of said evaporator coil touches the previous winding; said evaporator coil being fluidly connected to said condenser coil and the suction port of said oil-less compressor.

7. A refrigeration type mobile air conditioning unit of claim 6 wherein said second section further comprises heating elements.

8. A method of air conditioning an enclosed area comprising utilizing a refrigeration type mobile air conditioning system powered by a dc power source, said system having at least one compressor driven by a dc motor which compresses a refrigerant, said compressor being fluidly connected to at least one condenser coil, said condenser coil being wrapped in a metal gauze and wound helically to form a cylinder wherein said refrigerant is condensed prior to transfer to at least one evaporator coil housed within a substantially enclosed plenum having means for fluid communication with said enclosed area, said evaporator coil being wrapped in a metal gauze and wound helically to form a cylinder and wherein said refrigerant evaporates and removes heat from the surrounding air thereby cooling said air prior to discharge to said enclosed area by said means for fluid communication with said enclosed area.

\* \* \* \* \*